Dec. 3, 1968   D. E. HARPFER   3,414,448
METHOD OF PRODUCING REINFORCED HOSE
Filed March 1, 1965
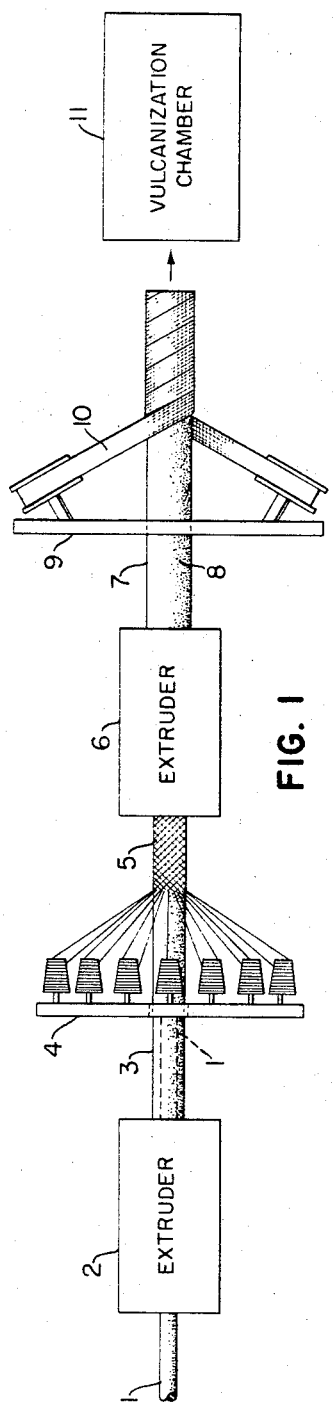
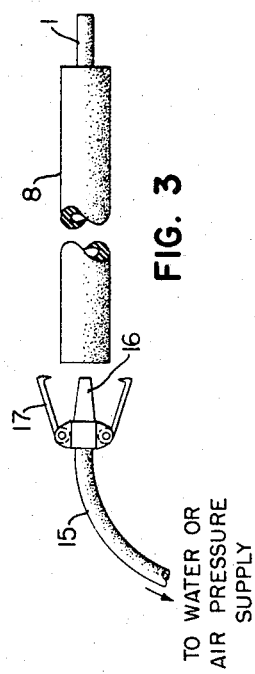
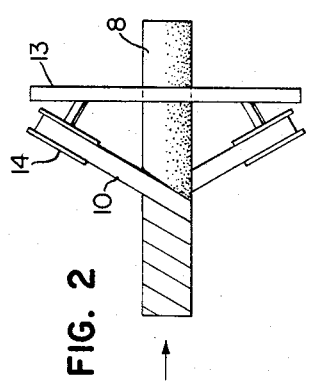
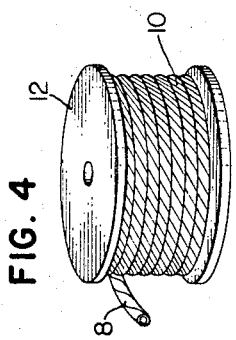
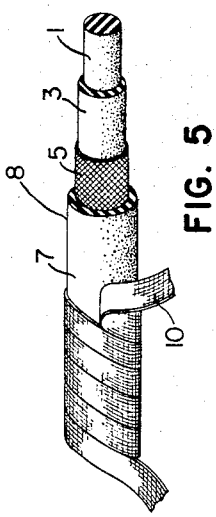
INVENTOR.
DONALD E. HARPFER
BY
J.B.Holden
ATTORNEY United States Patent Office 3,414,448
Patented Dec. 3, 1968

3,414,448
METHOD OF PRODUCING REINFORCED HOSE
Donald E. Harpfer, Akron, Ohio, assignor to The Goodyear Tire & Rubber Company, Akron, Ohio, a corporation of Ohio
Filed Mar. 1, 1965, Ser. No. 436,249
1 Claim. (Cl. 156—149)

ABSTRACT OF THE DISCLOSURE

A method of producing a reinforced hose by extruding an inner tube of rubber on a flexible mandrel, applying a reinforcement layer around the inner tube, extruding an outer cover layer of rubber over the reinforcement layer, wrapping a removable cloth restraining layer around the cover layer and vulcanizing the wrapped assembly under heat and pressure. After vulcanization, the restraining layer is removed and the vulcanized hose is removed from the mandrel. Since a flexible mandrel is used, the hose may be cured either in an elongated vulcanization chamber, or may be coiled on a drum and vulcanized in an autoclave.

---

It is well known in the prior hose making art to extrude tubular layers of a vulcanizable rubber material onto a rigid mandrel and to apply textile fiber yarn reinforcing layers between the layers of rubber material by braiding, weaving, knitting or merely winding the yarns thereon in substantially contiguous spirals. The lengths of hose with the rigid mandrel therein are encased in a lead jacket or they may be wrapped with cloth tape. They are subsequently placed in a long chamber and subjected to heat and pressure, usually steam to vulcanize the hose assembly into an integral structure. The jacket is then stripped from the hose which then is removed from the mandrel.

Another well known method of hose making is to extrude multiple layer rubber tubing which has layers of textile or other reinforcement material interspersed between the rubber layers and to vulcanize the hose without an internal mandrel. In this method of manufacture, the lengths of hose are encased in a lead jacket and pressure applied to the interior of the hose by plugging one end while introducing pressurized air or other fluid into the other end. Usually each length of the jacketed hose is wound on a large drum and placed in an autoclave into which heat is introduced to vulcanize the hose assembly into an integral structure. After vulcanization, the lead jacket is stripped off and remelted for re-use.

The disadvantages of the above processes are the requirement of a large amount of floor space, particularly when rigid mandrels are used, the expenditure of large amounts of labor, power and heat; and the use of massive equipment to apply the lead jacket to handle the bulky lead-jacketed hose, and to remove the lead from the hose after vulcanization. All this greatly increases the costs of the finished product.

The primary object of this invention is to provide a method of manufacturing long continuous lengths of hose which method will dispense with the use of a lead jacket and will materially reduce the cost of the equipment required.

A second object of the invention is to provide a method of manufacturing hose in which a light weight flexible jacket is mechanically wrapped on the hose to encase the hose during vulcanization.

A further object of the invention is to provide a method by which the hose is easier to handle and may be readily coiled for vulcanization so as to take up less room while being vulcanized.

A still further object of the invention is to provide a method of making hose on a flexible mandrel and encasing it in a flexible jacket which combination permits the hose to be wound more compactly for vulcanization thereby eliminating the need for a long straight vulcanization chamber.

Another object of the invention is to provide a method of manufacturing hose on a flexible mandrel so that substantial pressure may be applied to the hose during vulcanization.

In the drawings:

FIG. 1 is a diagrammatic view of the equipment and sequence of operations in carrying out the method of this invention through the vulcanizing step;

FIG. 2 is a diagrammatic view showing one step in the manufacturing operation;

FIG. 3 shows one means of removing the hose from the mandrel;

FIG. 4 is a perspective view of a length of jacketed hose prepared for vulcanization;

FIG. 5 is a cutaway view showing a portion of the hose prior to vulcanization.

Referring now to the details of the drawing, FIG. 1 illustrates schematically the sequence of steps in a typical method of making hose according to the teachings of the invention. A flexible mandrel 1 is moved longitudinally through an extruder 2 which forms on the mandrel 1, the inner tube 3 of the hose of an elastomeric material such as rubber, synthetic or natural, or other similar material.

Prior to passing through extruder 2, mandrel 1 may be coated with any other well known lubricant such as silicone, which serves as a parting agent to prevent the hose from sticking to the mandrel thereby making the removal of the hose from the mandrel after vulcanization less difficult.

The mandrel 1 with the tube 3 thereon passes from the extruder 2 through a braider 4 which applies a reinforcement or strength layer 5 over the tube 3. As shown, the machine 4 is a braider but it is to be understood that the particular type of reinforcement layer may be varied to conform to the particular requirements of the hose and may be formed of textile or metallic elements. The partially completed hose then passes through a second extruder 6 which forms an outer cover 7 of an elastomeric material such as rubber, synthetic or natural, or other similar material over the braided layer 5 to complete the hose body 8. The mandrel 1 and the hose body of layers 3, 5 and 7 are then helically wrapped by a wrapping machine 9 with a flat cloth tape 10 under tension to serve as a flexible jacket during vulcanization. The flat cloth tape 10 is sometimes applied wet to the hose so that the heat of vulcanization causes the tape to shrink and thereby apply additional pressure to the hose during vulcanization.

There are many conventional wrapping machines such as a Terkelson wrapper or other similar machines which will perform this operation.

The hose 8 is then subjected to heat and pressure for example in an autoclave or other heated chamber. One of the common mediums used to provide the necessary heat is steam.

When subjected to elevated temperatures and the shrinkage of tape 10, expansion of the rubber in the hose body subjects the hose to pressure between tape 10 on the hose body and mandrel 1. The use of the flexible tape 10 permits the jacketed hose either to be vulcanized straight in a long vulcanization chamber 11 or wound on a drum 12 (FIG. 4) for vulcanization in a conventional autoclave, not shown. A much greater length of the tape wrapped hose may be wrapped on the drum 12 and the drum and hose is much lighter and easier to handle than the lead jacketed hose and drum and a much more compact coil of the wrapped hose may be formed.

After the hose 8 is removed from the vulcanization chamber 11, tape 10 is unwound from the hose by a machine 13 (FIG. 2) similar to the wrapping machine 9 used to wrap tape 10 on the hose prior to vulcanization. Tape 10 may be rewound onto rolls 14 for reuse or may be discarded if desired.

After removal of the tape 10, the hose 8 is removed from the mandrel 1, for example, by blowing water pressure into one end of the hose from a water line 15 having an end nozzle 16 which is connected to one end of the hose 8 by a clamp assembly 17 which grips the ends of the hose. Any desired means may be used to remove the hose from the mandrel and the one shown is merely for the purpose of illustration.

Described in more detail, mandrel 1 may be made of any flexible material such as rubber, thermoplastic or other suitable material which will not materially deteriorate during vulcanization of the hose so that the mandrel may be re-used. The mandrel material should also have the desired degree of flexibility while retaining sufficient rigidity to prevent collapse of the hose during vulcanization. As shown, the mandrel 1 is solid in cross section but, if desired, may include longitudinal strands of wire rope or textile fibers or various types of monofilaments as reinforcement. Other types of reinforcement such as knitted, woven or braided filaments may also be used.

The mandrel may be hollow or tubular throughout its length. Preferably internal pressure should be supplied to the interior of the hollow mandrel to prevent collapse of the mandrel during the hose making and vulcanization operations. Use of a hollow mandrel permits the circulation of steam, hot water or other vulcanizing medium through the mandrel to reduce the time necessary for vulcanization. In some instances by using a hollow mandrel through which steam or hot water is circulated, the vulcanization of the hose may be carried out solely from the heat thereof but preferably, the hose should be covered with an insulating blanket or placed in an insulating chamber to prevent undue heat loss.

In FIG. 5, a typical hose 8 is shown in a cutaway view mounted on the mandrel 1 and having an inner tube 3, an outer cover 7 with an intermediate textile reinforcement layer 5. A cloth tape jacket 10 is shown wrapped on the hose 8 in a manner previously described.

It will be understood that while the drawings and specification show a hose having a single layer of textile reinforcing material between two layers of rubber it will be apparent that any number of layers of reinforcement and any number of layers of rubber could be used. This could be accomplished by merely increasing the number of extruders or using strips of rubber or doughs between layers of reinforcement and increasing the number of braiding machines, or by increasing the number of passes made through the extruders and braiding machine. It will also be apparent that the reinforcing layer may be of metal, fiber glass, synthetic or natural textile materials and that the reinforcement layer may be helically wrapped, knitted or woven in many configurations other than the braiding operation which was used for the purpose of illustration.

In manufacturing hose by the method disclosed in this invention, the flexible mandrel 1 passes through the extruder 2 where it receives a layer of rubber which forms the inner tube 3 and then passes through a braiding machine 4 where a layer of textile yarns 5 is braided over the inner tube 3. The extruder 6 deposits an outer cover 7 over the braided layer 5 to form an unvulcanized hose 8 which then passes through wrapping machine 9 which wraps a cloth tape jacket 10 on the hose. The hose is then placed in the vulcanization chamber 11 where it is vulcanized by steam heat. After vulcanization, the tape 10 is removed and either wound for re-use or is discarded. The hose is then stripped from the mandrel and prepared for shipment.

While certain representative embodiments and details have been shown for the purpose of illustrating the invention, it will be apparent to those skilled in this art that various changes and modifications may be made therein without departing from the spirit and scope of the invention.

What is claimed is:

1. The method of producing reinforced hose of a long continuous length comprising at least the steps of
    (A) passing a length of flexible mandrel through an extruder to form an inner tube thereon of elastomeric material;
    (B) applying a reinforcement layer on said inner tube;
    (C) passing the mandrel with said inner tube and reinforcement layer thereon through an extruder to form a cover of elastomeric material over said reinforcement layer;
    (D) applying under tension a restraining wrap of flat flexible material over said cover thereby forming a wrapped assembly;
    (E) coiling the wrapped assembly on a drum;
    (F) vulcanizing the wrapped assembly in a heated chamber while coiled on the drum with the elastomeric material of said tube and cover being subjected to pressure between the wrap and mandrel whereby said inner tube, reinforcement layer and cover are united into an integral structure;
    (G) removing the wrapped assembly from the drum;
    (H) removing the wrap from the hose; and
    (I) removing the hose structure from the mandrel.

References Cited

UNITED STATES PATENTS

| | | | |
|---|---|---|---|
| 2,974,713 | 3/1961 | Hydrick | 156—149 |
| 1,913,327 | 6/1933 | Barnes | 156—149 |
| 2,724,673 | 11/1955 | Hunter | 156—149 |

PHILIP DIER, *Primary Examiner.*